Jan. 5, 1926.

D. ELDER 1,568,214

APPARATUS FOR WATERING AREAS OF LAND

Original Filed Jan. 5, 1922   3 Sheets-Sheet 2

Inventor
D. Elder,
By Marks & Clerk
Attys.

Jan. 5, 1926.　　　　　　　　　　　　　　　1,568,214
D. ELDER
APPARATUS FOR WATERING AREAS OF LAND
Original Filed Jan. 5, 1922　　3 Sheets-Sheet 3

Fig. 9.

Inventor
D. Elder.

By　Marks & Clerk.

Attorney

Patented Jan. 5, 1926.

1,568,214

UNITED STATES PATENT OFFICE.

DONALD ELDER, OF ONEHUNGA, AUCKLAND, NEW ZEALAND.

APPARATUS FOR WATERING AREAS OF LAND.

Original application filed January 5, 1922, Serial No. 527,259. Divided and this application filed July 28, 1922. Serial No. 578,196.

*To all whom it may concern:*

Be it known that I, DONALD ELDER, a citizen of the Dominion of New Zealand, residing at Onehunga, Auckland, in the Provincial District of Auckland, in the Dominion of New Zealand, have invented certain new and useful Improvements in Apparatus for Watering Areas of Land, of which the following is a specification.

This invention relates to improvements in means employed in watering areas of land and is a division of my original application filed January 5, 1922, Serial No. 527,259.

The invention has for its object to provide an apparatus for watering land comprising the watering being made to take place at predetermined intervals and so that each watering extends over a predetermined length of time, in order that every portion of an area under treatment, no matter what the shape of the latter is, will have evenly distributed thereon at regular intervals, a given quantity of water The improved apparatus comprises a sprayer, and a device hereinafter referred to as a "repeater" for controlling the operation of the whole apparatus in that it causes the waterings to take place at the desired intervals as circumstances require. The repeater works in conjunction with and is dependent for its operation upon the working of a further device hereinafter referred to as a "regulator" which latter is preferably connected with a sprayer of the type disclosed in my copending application Serial No. 527,259.

The portion of the control of the watering of the land vested in the latter device is the control of the length of the periods during which the waterings shall take place, so as to ensure that a given quantity of water will be distributed over the area in a given time following each turning on operation of the repeater.

The repeater comprises a pair of cylinders containing plungers, on rods connected to the opposite ends of a lever fixed on the end of the plug of a main cock controlling the flow of water from a water service to the apparatus. One of these cylinders is connected with and is adapted to be put in communication with the water service pipe, or the inlet side of said main cock, for the purpose of receiving water pressure from the water service pipe, whereby the plungers in said cylinder will be operated to effect the opening of the main cock, in order that water may pass to the regulator and from the latter to the sprayer. The other of the cylinders is connected with and is adapted to be put in communication with the pipe connecting the main cock with the regulator, whereby said last mentioned cylinder on the pressure in the pipe from the main cock exceeding that which exists while the sprayer is in operation receives pressure which operates its plungers and brings about the turning off of the main cock.

The repeater is also fitted with two cocks through which water must pass on its way from the water service pipe, or the inlet side of the cock to the cylinder. the plungers of which operate to bring about the turning on of the main cock. One of these cocks is constructed and operates in conjunction with the main cock for the purpose of controlling the number of times the latter shall operate, while the other of said cocks is provided for regulating the rate of flow of the water to the last mentioned cylinder.

Means are also provided on the repeater for providing for the discharge of water from the cylinders after the plungers therein have operated, and from the pipe connecting the main cock with the regulator, after the main cock has been turned off.

The regulator comprises a cylinder divided into three compartments, between the lowermost of which and the central or intermediate compartment a movable partition in the form of a plunger is provided. The central or intermediate compartment or the space between the plunger and the upper fixed division is filled with water, the length of time taken in the displacement of which or portion thereof, into the uppermost compartment through a regulatable valve in the upper division, by the pressure created in the lowermost compartment on the entrance of water thereinto from the repeater, equals the length of the period of each watering. The regulator is connected with the sprayer and also when necessary with a further regulator. In the latter case, the cutting off of the water from the sprayer and the opening of the water passage to a succeeding regulator takes place simultaneously on the plunger in the regulator rising a predetermined height.

Where a succeeding regulator is not employed, the cutting off of the water from the sprayer results in an excess of pressure in the pipe from the main cock, whereupon the repeater operates and causes the said main cock to be turned off.

The invention will now be more particularly described in conjunction with the accompanying drawings wherein:—

Figures 1, 2, 3, 4:
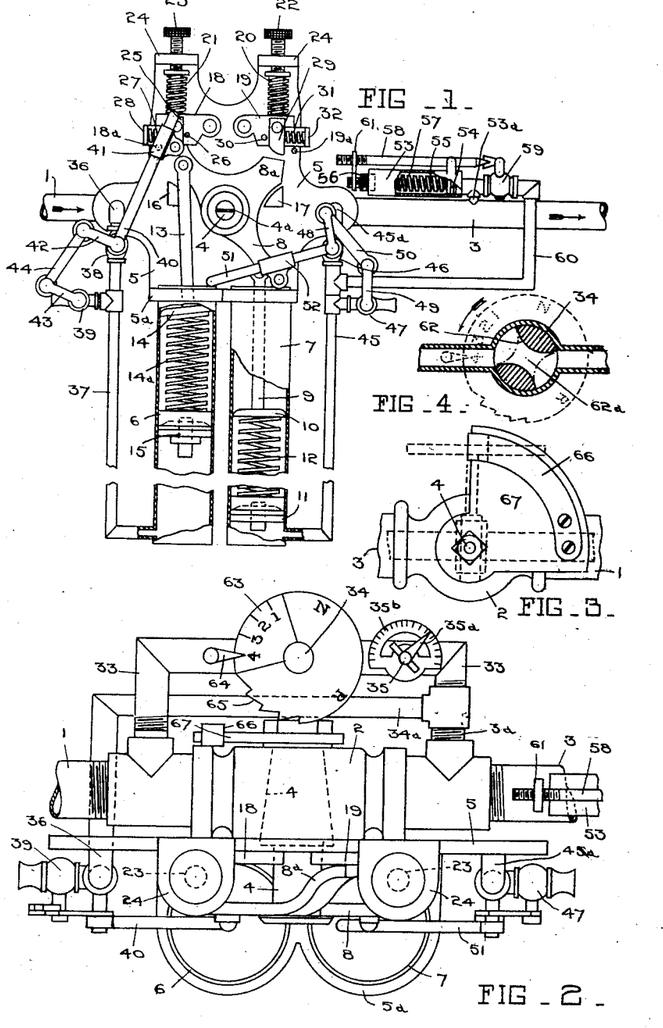
Figure 1 is an elevation (with parts in section) of the repeater.
Figure 2 is a plan view (slightly enlarged) of same.
Figure 3 is an elevation of the main cock, from the opposite side to that shown in Figure 1 showing the quadrant and spring pawl thereon.
Figure 4 is a sectional plan view of the repeating or dial cock of the repeater.
Figures 5, 6, 7, 8:
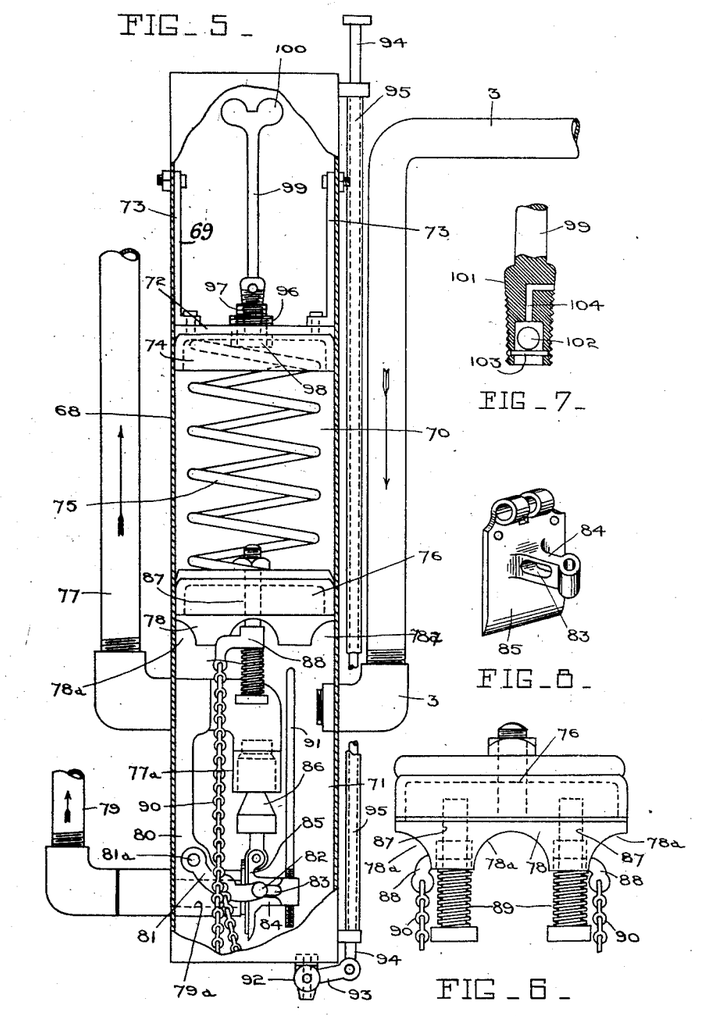
Figure 5 is a part elevation and a part sectional elevation of the regulator.
Figure 6 is an enlarged view of the regulator plunger.
Figure 7 is an enlarged sectional elevation of the valve used at the top of the regulator.
Figure 8 is a perspective view of the valve used in the lower end of the regulator for controlling the passage of water to a further regulator.

Referring to Figures 1 and 2 of the drawing which illustrate the repeater, 1 is a service pipe supplying water to the main cock 2, and 3 is the pipe through which the water passes from the cock 2 to the regulator illustrated in Figure 5.

The plug 4 of the cock 2 projects through and works freely in the plate 5 secured on the pipes 1 and 3 said plate being formed with a bracket 5ª in or to which are secured cylinders 6 and 7.

The lever 8 mounted centrally on the plug 4 on the same side of the plate 5 as the cylinders 6 and 7, has pivotally connected to one end a rod 9, on the lower end of which is secured a plunger 10 which works in the cylinder 7. A lower plunger 11 in the cylinder 7, is suspended from the upper plunger 10 by a spiral spring 12. The other end of the lever 8 has pivotally connected thereto a rod 13 on the lower end of which is a plunger 14 operating in the cylinder 6, while suspended within the latter from the upper plunger 14 by a spiral spring 14ª is a lower plunger 15.

The lever 8 has projecting therefrom at right angles to its length a central arm 8ª with a pointed outer end adapted to work between stops 16, and 17 on the plate 5. Above the stops 16, 17 are plates 18, 19 pivotally attached to the plate 5 at their inner ends and normally resting in horizontal positions on stops 18ª, 19ª, under the influence of compression springs 20, 21 regulatable by means of thumb screws 22, 23 working through brackets 24 at the top of the plate 5.

The plate 18 has pivoted thereon a catch 25 inward movement of which is limited by a stop 26 on the plate 18, and capable of outward movement against the action of a spring 27, mounted between said catch 25, and an extension 28 of the plate 18.

The plate 19 has pivoted thereon a catch 29, inward movement of which is limited by a stop 30 on the plate 19, and capable of outward movement against the action of a spring 31 mounted between the catch 29 and an extension 32 of the plate 12.

The lower ends of the catches 25, 29 are sloped or curved inwards and upwards.

A branch pipe 33 Figure 2 communicates with the pipe 1 and is fitted with a cock 34 and a cock 35 is connected by means of a pipe 34ª with an elbow 36 screwing on a nipple which projects through the plate 5 outside the cylinder 6 and from the same side of the plate as said cylinder 6. Neither of the pipes 33, 34ª communicate with the pipe 3, 3ª being merely a solid plug screwed into the T on the latter pipe to provide a support for said pipes 33 and 34ª.

The elbow 36 is connected with the lower end of the cylinder 6 by a pipe 37 in which are placed cocks 38, 39.

The plug of the cock 38 has keyed thereon one end of a rod 40 slidable in a sleeve 41 pivoted to the same end of the lever 8 as the rod 13.

Also keyed on the plug of the cock 38 is an arm 42, and keyed on the plug of the cock 39 is an arm 43, the two arms 42, 43 being pivotally connected at their outer ends by a rod 44. The plugs of the cocks 38, 39 are arranged and connected, so that when the cock 38 opens the cock 39 closes, and vice versa.

On the outer side of the cylinder 7 is a pipe 45 connected at its lower end with the bottom of the cylinder 7, and at its upper end screwing into an elbow 45ª fitted on to a nipple passing through the plate 5 into the pipe 3.

This pipe 45 is provided with cocks 46, 47 on the plugs of which are keyed arms 48, 49 respectively, said arms being pivotally connected at their outer ends by a rod 50. Also keyed on the plug of the cock 46 is a rod 51 which is slidable in a sleeve 52 pivotally connected to the same end of the lever 8 as the rod 9.

The plugs of the cocks 46, 47 are arranged and connected so that the latter are opened and closed together.

A small cylinder 53 open to the pipe 3 through a nipple 53ᵃ contains a plunger 54 mounted on the end of a rod 55 slidable freely through a plug 56 screwing into one end of the cylinder.

A spring 57 on the rod 55 between the plug 56 and the plunger 54 keeps the latter normally pressed towards the nipple 53ᵃ.

Outside the cylinder 53 is a sliding rod 58 one end of which is pivotally connected to the handle of a cock 59 on a pipe 60 leading from the plunger end of the cylinder 53 to the pipe 45 between the cocks 46, 47 thereon.

The outer end of the sliding rod 58 and the outer end of the plunger rod 55 are rigidly connected by a cross piece 61, so that both rods must move together in either direction.

The plug 62 of the cock 34 (Figures 2, 3 and 4), on the branch pipe 33 has fitted on its upper end a dial 63 which works beneath a fixed pointer 64 on the pipe 33. Portion of the periphery of the dial 63 is formed into ratchet teeth 65, adapted to be engaged when required by a spring pawl 66 on a quadrant 67 mounted on the plug 4 at the opposite side of the cock 2, to the plate 5.

The pawl 66 is attached to the quadrant at its lower end only, the other end being simply bent around the radial edge of the quadrant in order that said pawl can lie flat against the quadrant for its full length when necessary.

The dial 63 has marked thereon numerals, running from 1 up to the total number of teeth on the dial and diametrically opposite said numerals is the letter "R" while halfway between the latter and the numerals, the letter "N" is placed on the dial.

The plug 62 of the cock 34 has its port 62ᵃ (Figure 4) considerably enlarged at each end, so that if the dial 63 be set with the highest numeral thereon opposite the pointer 64, it will take an equivalent number of turning on movements of the plug 4 of the cock 2, to cause the pawl 66 to turn the plug 62 far enough round in the cock 34 to close the waterway through same. For example take the dial 63 shown in the drawing where the highest numeral is 4, say the numeral 4 is set opposite the pointer 64, it will require four separate turning on movements of the plug 4 to completely close the cock 34, as each time a turning on movement of the plug 4 takes place, the pawl 66 on the quadrant 67 engages a single tooth 65 of the dial 63 and turns the plug 62 a distance equal only to one fourth of the distance across the enlarged openings of the port 62ᵃ.

If after the cock 34 has been closed a further turning on movement of the plug 4 should occur, the pawl 66 will not impart turning movement to the dial 63, as the portion of the latter presented to the pawl, will have no teeth and the pawl 66 will simply be pressed flat against the quadrant 67. When the letter "R" is brought opposite the pointer 64, the port 62ᵃ is in such a position that the cock is opened with the teeth 65 located out of the way of the pawl 66 so that movement of the latter will not turn the dial 63. Similarly when the letter "N" is opposite the pointer 64, the pawl 66 will not impart turning movement to the dial 63 owing to the teeth 65 being clear of the pawl 66 only in this case the plug 62 is brought to a position which closes the water way through the cock 34.

The plungers 14, 15 in the cylinder 6 are utilized for the purpose of imparting movement to the lever 8 in order to cause the plug 4 to open the cock 2, while the plungers 10, 11 in the cylinder 7 are provided for the purpose of imparting the reverse movement to the lever 8 to cause the plug 4 to close the cock 2.

The cock 35 on the branch pipe 33 is provided for the purpose of regulating the flow of water to the cylinder 6, in order to cause the cock 2 to be turned on at predetermined intervals, and to facilitate the setting of this cock, the plug thereof is provided with a pointer 35ᵃ which works over a scale or series or graduations 35ᵇ by the aid of which the cock 35 can be adjusted to regulate the flow of water as required.

The operation of the repeater will now be briefly described, but before commencing such description, it will be pointed out that as shown in the drawing the cock 2 is open so water can pass from the pipe 1 through the cock 2 to the pipe 3. The end of the plug 4 contains a groove 4ᵃ which when horizontal denotes that the cock 2 is open, and when vertical serves to indicate that said cock is closed.

When the cock 2 is closed the arm 8ᵃ rests against the stop 16, the rod 9 is withdrawn from the cylinder 7 the rod 13 is down in the cylinder 6, the cocks 38, 46 and 47 are open and the cock 39 closed, while the positions of the rods 40, 51 are the reverse to that shown.

It will be assumed that the repeater is to cause the sprayer to distribute water over the land four times and the dial 63 has therefore been turned so that the numeral "4" is opposite the pointer 64. Also the cock 35 has been set to regulate the inflow of water to the cylinder 6 at a rate that will cause the cock 2 to be turned on after a predetermined period of time has lapsed from its turning off.

The cock 2 being closed water passes from the pipe 1 into the pipe 33 through the cocks 34, 35 and via the pipe 34ª to the pipe 37, the cocks 38, 39, the cock 38 being open and the cock 39 closed. The water from the pipe 37 enters the bottom of the cylinder 6 and accumulating therein forces the plunger 15 which is at the bottom of the cylinder upwards thereby compressing the spring 14ª between the plungers 14, 15. It must be remembered that in this position, the arm 8ª is held below the catch 25.

The pressure in the cylinder 6 gradually increases, until it is sufficient to overcome the resistance of the spring 21 and as this occurs the plungers 14, 15 move upwards in the cylinder 6 causing the rod 13 to force upwards the end of the lever 8 to which it is connected. This movement has the effect of forcing the pointed end of the arm 8ª to pass the catch 25 pivoted on the plate 18, the latter lifting on its pivot against the action of the spring 21. The lever 8 and arm 8ª then swing over to the position shown in Figure 1, said arm engaging and passing below the catch 29 which moves outward against the action of the spring 31 to allow the arm 8ª to come to rest against the stop 17. This last described movement of the lever 8 caused by the upward movement of the plungers 14, 15 in the cylinder 6 opens the cock 2, and water is now enabled to pass from the pipe 1 through the cock 2 to the pipe 3, leading to a regulator to be hereinafter described.

The turning on movement of the lever 8 brings the rods 40, 44 and arms 42, 43 to the positions shown in Figure 1, whereby the cock 39 is opened to permit water in the cylinder 6 to be discharged by the expansion of the spring 14ª and the cock 38 to be closed, to prevent communication between the pipe 37 and the pipe 34ª.

The same turning movement of the lever 8 brings the rods 51, 50 and arms 48, 49 to the positions indicated in Figure 1, which results in both the cocks 46, 47 being closed.

Water is now flowing through the pipe 3 to a regulator and from the latter to a sprayer, and so long as water is discharging from the system nothing happens.

Immediately, however, the discharge of water ceases, the pressure in the pipe 3 increases and the increased pressure also acts in the cylinder 53 which is in communication with the pipe 3 by way of the nipple 53ª. The spring 57 is set to withstand or to remain expanded while the pressure in the pipe 3 is normal, which occurs while water is discharging from the system, but immediately an increase of pressure occurs in the pipe 3 on the cessation of the discharge of water, the piston 54 is forced or moved against the action of the compression spring 57 whereby the rod 55 and the rod 58 are moved together away from the cock 59, the latter being opened by the movement of the rod 58 just indicated.

The opening of the cock 59 allows water to pass through the pipes 60 and 45 (the cocks 46, 47 being closed) into the bottom of the cylinder 7, the pistons 10, 11 in the latter now occupying the positions shown in the drawings.

The accumulation of pressure in the lower end of the cylinder forces the plunger 11 upwards and compresses the spring 12 against the plunger 10, until ultimately both plungers 10, 11 move upwards in the cylinder 7, and cause the arm 8ª to clear the catch 29 by forcing the latter and the plate 19 on which it is mounted upwards against the action of the spring 20.

The arm 8ª then swings over against the stop 16, and the lever 8 reverts to its former position which is at right angles to that shown in Figure 1 and in moving from the position shown in its former position it shuts off or closes the cock 2.

The turning off movement of the lever 8 operates the rods 40, 44 and arms 42, 43 to open the cock 38, and to close the cock 39, the same movement of said lever 8 causing the rods 51, 50 and arms 48, 49 to open both cocks 46, 47, whereby the water in the cylinder 7 is enabled to discharge through the cock 47 under the expansion of the spring 12, and water in the pipe 3 and regulator or regulators connected therewith to pass through the cock 46, as will be afterwards described.

Water will now again enter the cylinder 6 by way of the pipes 33, and 34ª, the cock 35 having been set to regulate the flow of water, so that the upward movement of the plungers 14, 15 in the cylinder 6, to open the cock 2, will occur after a predetermined period of time has elapsed following the closing of the cock 2.

Each time the plug 4 of the cock 2 is given turning movement to open the cock, it makes a quarter turn and just before it finishes such movement the spring pawl 66 on the quadrant 67 engages one of the teeth 65 on the dial 63 and imparts a slight turning movement to the plug 62 of the cock 34. As the plug 4 of the cock is turned to close the latter cock the pawl 66 slips against the teeth 65 so that reverse turning movement is not given the plug 62.

In the present case it is desired as before mentioned that the cock 2 shall be opened and closed four times to cause water to be sprayed over the land an equivalent number of times. Before the first turning movement of the plug 2 occurs, the plug 62 of the cock 34 occupies the position shown in Figure 4, and each time the cock 2 is opened, the plug 62 is turned slightly in the direction indicated, until on the completion of the fourth or last turning on movement of the plug 2, the waterway 62ª of the cock 34 is brought to the position shown by dots and dashes in Figure 4, when as will be observed, the waterway through the cock 34 will be closed, and after the cock 2 closes on the discharge of water from the system ceasing, no further operation of the cock 2 can take place, until the dial 63 is re-set.

From Figure 4 it will also be seen that should the letter "R" on the dial 63 be brought beneath the pointer 64, the water way through the cock 34 will be open, with the teeth 65 in such a position that the pawl 66 will not actuate the dial 63 and the cock 2 therefore will go on opening and closing indefinitely. If the letter "N" be brought opposite the pointer 64, the water way through the cock 34 will be closed, and the cock 2 will not operate at all, owing to there being no passage of water to the cylinder 6.

The regulator (Figures 5 to 8) comprises a cylinder 68 closed at the bottom and divided into three compartments 69, 70 and 71. The division between the uppermost compartment 69 and the central compartment 70 consists of a disc 72 secured to the lower ends of hangers 73 bolted inside the cylinder. A bucket leather 74 secured to the underside of the disc 72 renders the division water tight. Also secured to the underside of the disc 72 is a spiral spring 75 the lower end of which supports a plunger 76, the latter providing the division between the central compartment 70 and the lowermost compartment 71.

Figure 9:
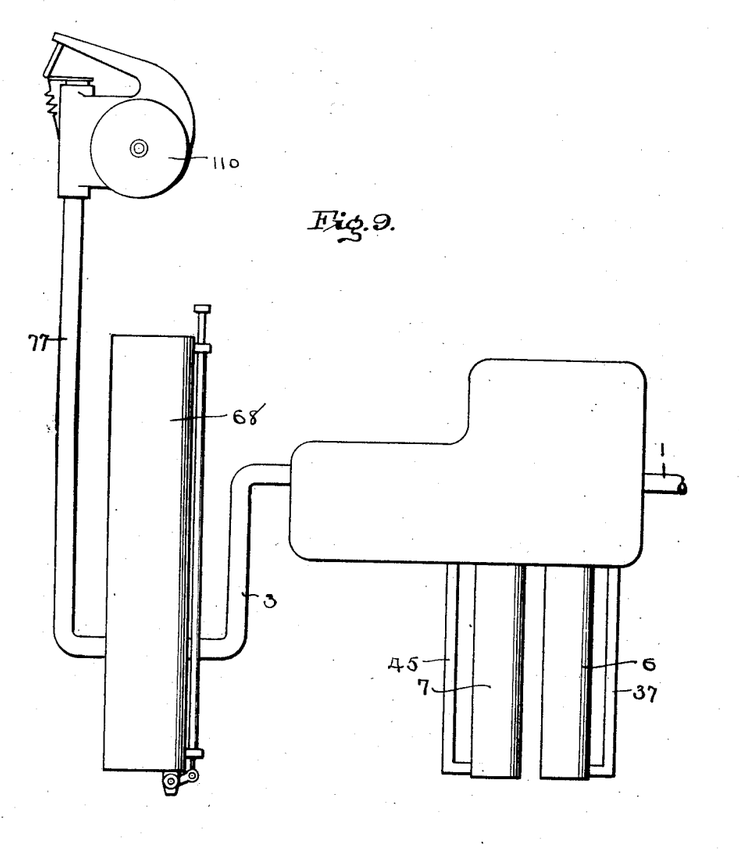
Figure 9 is a diagrammatic view of the regulator repeater operatively associated with a sprayer.

The pipe 3 from the repeater (Figures 1 and 2) leads into the compartment 71, while from the latter a pipe 77 leads to a sprayer 110, Fig. 9.

The pipes 3 and 77 both project into the compartment 71, the latter pipe having a downwardly extending portion 77ª located centrally in the compartment 71.

The plunger 76 is formed with a flange 78 having portions cut away at 78ª in order that said flange will rest or sit on the ends of the pipes 3 and 77 within the cylinder 68 when said plunger is as far down as it will go in the cylinder.

To enable the regulator to be connected with a further regulator, a further outlet pipe 79 leading from the compartment 71 is provided. This pipe 79 connects with a passage 79ª in a fitting 80 preferably hung from the pipe 77.

A pin 81ª passes horizontally through the fitting 80 has keyed on each end an arm 81, said arms being connected at their outer ends by a pin 82 passing through a horizontal slot 83 in a lug 84 projecting from a valve 85 hinged at its upper edge to the stem of a cone-shaped valve 86 entered in and capable of being seated in the portion 77ª of the pipe 77.

The valve 85 is adapted to control the flow of water through the passage 79ª to the pipe 79, by closing the inner end of said passage.

Projecting downwards from the plunger 76, are two directly opposite rods 87, each of which has thereon a sliding arm 88 mounted above a compression spring 89 which normally force said arms upwards. The arms 88 are connected by chains 90 with the arms 81. A vertical rod 91 screwing into the lugs 84 of the valve 85 is adapted to be engaged by the plunger 76 as the latter moves downwards in the cylinder 68.

A draining cock 92 at the bottom of the cylinder 68 has pivotally connected to its handle 93, a rod 94 which works vertically in a tube or guide 95. On pulling the rod 94 upwards the cock 92 is opened and on pushing said rod downwards said cock is closed.

The disc 72 is formed with a central boss 96 through which screws a nipple 97, on the lower end of which is a nut 98, the latter providing the means of securing the spring 75 and the bucket leather 74 to the disc 72.

A rod 99 provided with a thumb piece 100 at its upper end, and formed with an enlarged and slightly tapered lower end 101 Figure 7 made hollow to take a ball 102 is threaded externally to screw into the nipple 97, a cross pin 103 being inserted in the enlarged end 101 to retain the ball 102 therein.

A port 104 from the upper end of the chamber containing the ball 102 opens out through the side of the enlarged end 101.

The water from the repeater flows through the pipe 3 into the compartment 71 and passes into the pipe 77 through the open lower end of the portion 77ª of the latter. For the sake of facilitating the illustration of the regulator the plunger 76 has been shown suspended, normally it rests on the inner ends of the pipes 3 and 77.

The outflow of water from the pipe 77 is restricted by the latter being connected with a sprayer, therefore all the water entering the compartment 71 cannot escape by way of the pipe 77. It is here necessary to mention that the compartment 70 or the space between the disc 72 and plunger 76 is filled with water.

The water unable to escape via the pipe 77 accumulates in the compartment 71, and the pressure thereof forces the plunger 76 upwards against the action of the spring 75 and water held in the compartment 70.

The water in the compartment 70 is forced upwards and presses the ball 102 against a seating at the lower end of the port 104 thereby blocking the escape of water through the latter, and said water can therefore only escape into the uppermost compartment 69 by passing around the screw threads between the tapered and enlarged end 101 and the nipple 97. If it is desired that the water in the compartment 70 shall pass quickly into the compartment 69, the end 101 is not screwed tightly into the nipple 97, but if on the other hand it is desired that the escape of water from the compartment 70 to the compartment 69 shall be slow, then the end 101 is screwed further into the nipple 97.

The plunger 76 rises in the cylinder 68 against the action of the spring 75 and the water in the compartment 70 and when high enough tightens the chains 90 which raise the arms 81, the latter in turn lifting the valves 86 and 85 and rod 91.

The valve 86 as it passes further into the portion 77ª of the pipe 77 is caught by the water passing into the latter, and seated with a sudden movement in said portion 77ª thereby completely closing the lower end of the latter.

This sudden movement of the valve 86 pulls the valve 85 up clear of the entrance to the passage 79ª and allows water to pass through the pipe 79 to the next regulator, which is likewise connected with a sprayer, and also with a further regulator if necessary. Each regulator operates in turn as described and after having operated each remains with the plunger 76 forced upwards the entrance to the pipe 77 closed, and with the entrance to the pipe 79 open. The last regulator to be operated is not provided with an outlet pipe 79, or valve 85, therefore when the valve 86 in said regulator closes the entrance to the pipe 77 leading to the last sprayer or watering device, there is no way of escape for the water and the pressure in the system at once increases, and it is this increase of pressure which also occurs in the pipe 3, that actuates the piston 54 in the cylinder 53 of the repeater to ultimately bring about the closing of the cock 2, as has already been described. Simultaneously with the closing of the cock 2 of the repeater, the cocks 46 and 47 of the latter are opened to provide for the escape of the water held in the pipe 3 and the parts in communication therewith, by the downward movements of the plunger or plungers 76 Figure 5 which force the water in the space or spaces 71 back through the pipe 3 to discharge from the cock 47 of the repeater, together with the water from the cylinder 7 of the latter.

During downward movement of each plunger 76 the water which has passed from the compartment 70 up in to the compartment 69 may return into the former compartment by way of the port 104 in the enlarged end 101 of the rod 99, the ball 102 having dropped on the cross pin 103 as shown thereby leaving said port 104 open.

The length of time during which water shall issue from a sprayer connected with the pipe 77 and designated at 110 in Fig. 9 is controlled by the regulator from which said sprayer receives its supply water, the action of the regulator being governed by the rate at which the water escapes from the compartment 70 to the compartment 69, and by the resistance of the spring 75.

Thus it will be seen that the issue of water from the sprayer can be made to extend over long or short periods, by adjusting the enlarged end 101 of the rod 99 in the nipple 97, to permit the water to pass slowly or quickly from the compartment 70 to the compartment 69 as required.

By regulating the length of time the sprayer shall discharge water, a given quantity of water is enabled to be sprayed over the land, said given quantity of water being discharged at predetermined intervals, by the action of the repeater.

The presence of the spring 75 in the regulator renders the same positive in operation, as when the water supply is cut off by the cock 2 of the repeater, said spring ensures the return or downward movement of the plunger 76, whereby the valve 86 opens the lower end of the portion 77ª and the valve 85 closes the entrance to the passage 79ª, owing to the plunger 76 striking and moving the rod 91 downwards, the regulator being again ready for use the next time water passes to same.

I claim as my invention:

1. Apparatus for use in watering land comprising a main cock including an inlet, an outlet and a cock plug adapted to control the passage of water to a sprayer; a lever on said cock, a cylinder, plungers in said cylinder connected with one end of said lever on the cock plug, said cylinder being adapted to receive water from the inlet side of said cock; a second cylinder, plungers in said second cylinder connected with the other end of said lever, said second cylinder being adapted to receive water from the outlet of the cock; means for discharging water from the cylinders; and means whereby there is caused in the pipe leading water from the cock, a pressure greater than that which exists in said pipe when the sprayer is in use.

2. Apparatus for use in watering land, comprising a main cock controlling the passage of water to a sprayer; a lever on the main cock, a cylinder containing plungers connected with one end of said lever adapted to receive water through a pipe from the inlet side of said main cock, for the purpose of opening the latter, a second cylinder, plungers in the second mentioned cylinder connected with the other end of said lever adapted to receive water through a pipe from the pipe leading water from said main cock, for the purpose of closing the latter, check catches coacting with said lever, cocks on the pipes to the cylinders, opened and closed by the operation of the lever on the main cock; means for discharging water from the cylinders; and means whereby there is caused in the pipe leading water from the main cock a pressure greater than that which exists in said pipe when the sprayer is in use.

3. In apparatus having a pair of cylinders containing plungers operated to open and close a main cock controlling the passage of water to a sprayer, a main cock, a cylinder in communication with the pipe leading from said cock, a plunger in said cylinder adapted to be operated by pressure in said pipe in excess of that which exists therein when the sprayer is in use, for the purpose of putting the cylinder in which plungers are operated to close the main cock, in communication with the pipe leading from the main cock.

4. In apparatus according to claim 1, a cylinder in communication with the pipe leading from the main cock controlling the passage of water to the sprayer; a spring actuated plunger in said cylinder, a pipe line connecting the outlet side of the main cock with the second mentioned cylinder, and a rod connected to and moving with the plunger rod for the purpose of opening and closing said pipe line.

5. In apparatus according to claim 1 a cylinder in communication at one end with the pipe leading from the main cock controlling the passage of water to the sprayer; a plunger in said cylinder, a rod on said plunger working through an end of the cylinder; a compression spring on the plunger rod between the plunger and a cylinder end; a pipe providing communication between the pipe leading from the cock controlling the passage of water to the sprayer, and the second mentioned cylinder; a cock for opening and closing the last mentioned pipe; a discharge cock on the latter pipe; a rod adjustably connected at one end with the plunger rod, and connected at its other end to the handle of last mentioned cock.

6. An apparatus according to claim 1 characterized by the provision of a spring connecting the plungers in each cylinder, the latter having a water inlet and outlet at the end of the cylinder, opposite that through which the plunger rod works.

7. In apparatus for use in watering land, a cock adapted to control passage of water to a sprayer, a cylinder, a pipe providing communication between the inlet side of the cock and the cylinder, plungers in said cylinder operable to open said cock; a cock on said pipe for opening and closing same; and a discharge cock on said pipe.

8. In apparatus for use in watering land, a cock controlling the passage of water to a sprayer, a lever on the plug of said cock, cylinders, plungers in said cylinders, rods connecting said plungers with said lever; a pipe providing communication between the inlet side of said cock and one of the cylinders; a pipe providing communication between the outlet side of said cock and the other of said cylinders, and cocks in the pipes to said cylinders connected with the lever on the control cock, so as to be opened and closed by the movement of said lever.

9. Apparatus for use in watering land, according to claim 8, wherein the cocks on the pipe between the inlet side of the control cock and the cylinder connected therewith are arranged and connected, so that one of said cocks opens simultaneously with the closing of the other, and wherein the cocks on the pipe between the outlet side of the control cock and the cylinder connected therewith are arranged and connected to open and close together for the purpose set forth.

10. In apparatus for use in watering land a cock controlling the passage of water to a sprayer having a plug, a plate secured adjacent said cock and receiving said plug; cylinders secured to said plate; a lever on the cock plug; stops and catches on said plate, and an arm on said lever working between said stops and engageable with the catches.

11. An apparatus for controlling the watering of land according to claim 10, wherein the arm on the lever mounted on the cock plug has a pointed outer end and wherein each catch is pivoted and sloped inwards and upwards at its lower end and is normally pressed inwards against a stop by a spring, said catch, the second mentioned stop and spring being mounted on a pivoted plate normally pressed downwards against a stop by an adjustable spring.

12. In apparatus for use in watering land, a main control cock, a cylinder, plungers in said cylinder operable to open the main control cock; a pipe from the inlet side of said cock, to said cylinder; a cock on said pipe including a movable part, a toothed member carried by the movable part; a pawl on the main control cock engaging said toothed member, and adjustable means for regulating the passage of water through said pipe.

13. Apparatus for use in watering land according to claim 12 wherein the toothed attachment comprises a dial with teeth in a portion of its edge, and wherein the pawl engaging therewith is a spring pawl secured on the main cock plug.

14. Apparatus for use in watering land according to claim 12, characterized in that the port through the second mentioned cock is formed with enlarged ends, and by the provision of position indicating markings on the toothed member, and a pointer coacting with said markings.

15. Apparatus for use in watering land according to claim 12 characterized by the provision of means for indicating the adjustment of the adjustable regulating means.

In testimony whereof I hereunto affix my signature.

DONALD ELDER.